(12) United States Patent
    Coic et al.

(10) Patent No.: US 10,292,014 B2
(45) Date of Patent: May 14, 2019

(54) DEVICE FOR DETERMINING PATH

(71) Applicant: INTERSEC, Paris la Défense (FR)

(72) Inventors: Jean-Marc Coic, Bourg la Reine (FR); Miguel Nunez Del Prado Cortez, Paris (FR); Sébastien Thouement, Puteaux (FR)

(73) Assignee: INTERSEC, Paris la Defense (FR)

( * ) Notice: Subject to any disclaimer, the term of this patent is extended or adjusted under 35 U.S.C. 154(b) by 0 days.

(21) Appl. No.: 15/749,285

(22) PCT Filed: Jul. 7, 2016

(86) PCT No.: PCT/FR2016/051734
§ 371 (c)(1),
(2) Date: Jan. 31, 2018

(87) PCT Pub. No.: WO2017/021600
PCT Pub. Date: Feb. 9, 2017

(65) Prior Publication Data
US 2018/0227716 A1   Aug. 9, 2018

(30) Foreign Application Priority Data

Jul. 31, 2015   (FR) ...................................... 15 57395

(51) Int. Cl.
*H04W 4/12*     (2009.01)
*H04W 4/18*     (2009.01)
(Continued)

(52) U.S. Cl.
CPC ............. *H04W 4/029* (2018.02); *H04W 4/12* (2013.01); *H04W 4/185* (2013.01); *H04W 4/38* (2018.02)

(58) Field of Classification Search
None
See application file for complete search history.

(56) References Cited

U.S. PATENT DOCUMENTS

2014/0113653 A1 * 4/2014 Wendling ............ H04L 41/0893
                                                        455/456.1
2014/0114561 A1   4/2014 Pakzad et al.
(Continued)

OTHER PUBLICATIONS

International Search Report dated Oct. 6, 2016 from corresponding International Application No. PCT/FR2016/051734, 7 pages.
(Continued)

*Primary Examiner* — Charles N Appiah
*Assistant Examiner* — Frank E Donado
(74) *Attorney, Agent, or Firm* — Ohlandt, Greeley, Ruggiero & Perle, L.L.P.

(57) ABSTRACT

A device for determining path comprises: a memory (4) for receiving signalling data associating mobile-communication-device identifiers, time markers and signalling identifiers, at least some of the signalling identifiers designating a location cell; a classifier (6) capable, for a given mobile-communication-device identifier, of marking the signalling data that are associated therewith with a movement marker indicating a state chosen from a list comprising at least one movement and one short stop; an analyzer (8) capable of processing the marked signalling data depending on the movement markers in order to produce path data associating, on the one hand, a given mobile-communication-device identifier and, on the other hand, a series of movement markers, each of which is associated with a location cell and with a time marker, so that two movement markers, the time markers of which indicate that they are successive, designate separate states, by applying at least one processing rule.

15 Claims, 3 Drawing Sheets

(51) Int. Cl.
   *H04W 4/029*   (2018.01)
   *H04W 4/38*    (2018.01)

(56) References Cited

U.S. PATENT DOCUMENTS

| | | | |
|---|---|---|---|
| 2014/0315583 A1 | 10/2014 | Yin | |
| 2015/0005014 A1* | 1/2015 | Huang | G01S 5/0263 455/456.5 |
| 2015/0079932 A1* | 3/2015 | Zelinka | H04W 4/029 455/411 |
| 2015/0327017 A1* | 11/2015 | Beauregard | H04W 4/023 455/456.6 |
| 2016/0134715 A1* | 5/2016 | Rowles | H04W 4/029 455/456.1 |
| 2016/0192139 A1* | 6/2016 | Kao | H04W 4/023 455/456.2 |

OTHER PUBLICATIONS

Written Opinion dated Oct. 6, 2016 from corresponding International Application No. PCT/FR2016/051734, 5 pages.

Calavia et al.; "A Semantic Autonomous Video Surveillance System for Dense Camera Networks in Smart Cities"; vol. 12, No. 12, Dec. 2, 2012, pp. 10407-10429.

* cited by examiner

DEVICE FOR DETERMINING PATH

The invention relates to the field of path detection, more particularly in a passive manner, on the basis of signaling data associated with a mobile device.

Determining flows of people moving between various locations is difficult. For a given location, it is possible to determine flows statistically, by humanly measuring the number of people entering and leaving. However, these methods are unreliable, expensive and poor in terms of contextual information. Specifically, it is not possible to know how these flows are distributed over time, the means of transport that are used, etc.

The invention aims to improve the situation. To this end, the invention proposes a path determination device that comprises a memory for receiving signaling data associating mobile communication device identifiers, time markers and signaling identifiers, at least some of the signaling identifiers denoting a location cell, a classifier that is capable, for a given mobile communication device identifier, of marking the signaling data that are associated therewith with a movement marker indicating a state chosen from among a list comprising at least a movement and a short stop.

The device also comprises an analyzer capable of processing the marked signaling data on the basis of the movement markers so as to produce path data associating a given mobile communication device identifier, on the one hand, and a series of movement markers each associated with a location cell and with a time marker, on the other hand, such that two movement markers whose time markers indicate that they are sequential denote different states, by applying at least one of the following rules:

a) changing arbitrary movement markers into movement markers indicating a short stop when, for two movement markers indicating a short stop associated with a single location cell, the number of movement markers whose time markers indicate that they are between these two movement markers is less than or equal to 4, b) changing movement markers indicating a movement into movement markers indicating a short stop when the time markers that are associated therewith indicate that they are preceded and followed by movement markers indicating a short stop and the time markers associated with the latter indicate a duration shorter than a first threshold, c) changing movement markers indicating a movement into movement markers indicating a short stop when the time markers that are associated therewith indicate that they are preceded and followed by movement markers indicating a short stop that are associated with one and the same location cell and the time markers associated with the latter indicate a duration shorter than a second threshold, d) changing movement markers indicating a short stop into movement markers indicating a movement when the time markers that are associated therewith indicate that they are preceded and followed by movement markers indicating a movement and the time markers associated with the latter indicate a duration shorter than a third threshold, e) merging movement markers indicating a short stop whose time markers indicate that they are consecutive, and associating, with the resulting movement marker, the location cell associated with the movement markers whose time markers represent the longest duration and a time marker corresponding to the sum of the durations of the associated time markers.

This device is highly advantageous as it makes it possible to determine paths in a passive manner, on the basis of signaling data from communication devices. This determination is reliable, able to be automated and inexpensive in terms of human means. It additionally enables statistical processing that makes it possible to qualify large amounts of contextual information.

In some variants, the device may have one or more of the following features:
- the classifier and the analyzer are called sequentially to produce path data,
- the analyzer applies rule a) before applying rule b),
- the analyzer applies rule b) before applying rule c),
- the analyzer applies rule c) before applying rule d), and
- the analyzer applies one of rules a), b), c) and d) before applying rule e).

The invention also relates to a path determination method comprising the following operations:

a) receiving signaling data associating mobile communication device identifiers, time markers and signaling identifiers, at least some of the signaling identifiers denoting a location cell, b) for a given mobile communication device identifier, marking the signaling data that are associated therewith with a movement marker indicating a state chosen from among a list comprising at least a movement and a short stop, c) processing the marked signaling data on the basis of the movement markers so as to produce path data associating a given mobile communication device identifier, on the one hand, and a series of movement markers each associated with a location cell and with a time marker, on the other hand, such that two movement markers whose time markers indicate that they are sequential denote different states, by applying at least one of the following rules:

c1) changing arbitrary movement markers into movement markers indicating a short stop when, for two movement markers indicating a short stop associated with a single location cell, the number of movement markers whose time markers indicate that they are between these two movement markers is less than or equal to 4, c2) changing movement markers indicating a movement into movement markers indicating a short stop when the time markers that are associated therewith indicate that they are preceded and followed by movement markers indicating a short stop and the time markers associated with the latter indicate a duration shorter than a first threshold, c3) changing movement markers indicating a movement into movement markers indicating a short stop when the time markers that are associated therewith indicate that they are preceded and followed by movement markers indicating a short stop that are associated with one and the same location cell and the time markers associated with the latter indicate a duration shorter than a second threshold, c4) changing movement markers indicating a short stop into movement markers indicating a movement when the time markers that are associated therewith indicate that they are preceded and followed by movement markers indicating a movement and the time markers associated with the latter indicate a duration shorter than a third threshold, c5) merging movement markers indicating a short stop whose time markers indicate that they are consecutive, and associating, with the resulting movement marker, the location cell associated with the movement markers whose time markers represent the longest duration and a time marker corresponding to the sum of the durations of the associated time markers.

In some variants, the method may have one or more of the following features:
- operation c) applies rule c1) before rule c2),
- operation c) applies rule c2) before applying rule c3), operation c) applies rule c3) before applying rule c4), and operation c) applies one of rules c1), c2), c3) and c4) before applying rule c5).

The invention also relates to a computer program product comprising portions of program code for implementing the device or the method according to the invention.

Other features and advantages of the invention will become more apparent upon reading the following description, taken from examples given by way of nonlimiting illustration, taken from the drawings, in which.

The drawings and the description hereinafter contain, above all, elements of a certain nature. They may therefore not only serve for improved understanding of the present invention, but also contribute to the definition thereof where appropriate.

The present description is such that it involves elements liable to be protected under trademark and/or copyright. The rights holder has no objection to anyone making identical reproductions of the present patent document or its description as it appears in official records. For the rest, the holder reserves its rights in their entirety.

Furthermore, the detailed description is supplemented by Appendix A, which gives the formulation of certain mathematical formulae used in the context of the invention. This Appendix is provided separately for the sake of clarity and to facilitate referrals. It forms an integral part of the description, and may therefore not only serve for improved understanding of the present invention, but also contribute to the definition thereof where appropriate.

Figure 1:
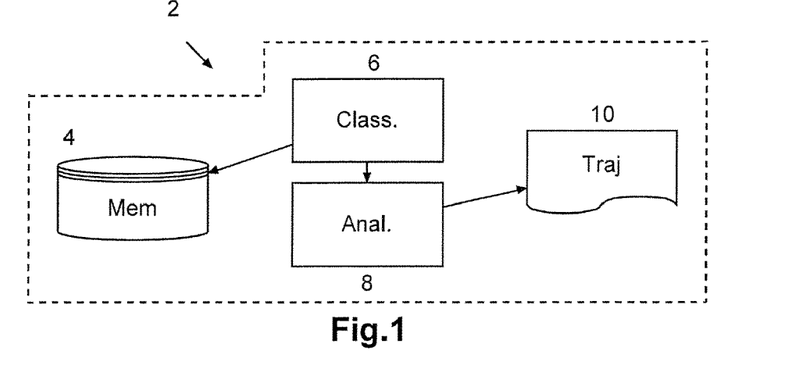
FIG. 1 shows a schematic view of a device according to the invention.

FIG. 1 shows a schematic view of a path determination device according to the invention.

The device 2 comprises a memory 4, a classifier 6 and an analyzer 8, which together produce path data 10.

In the example described here, the classifier 6 and the analyzer 8 are elements that access the memory 4 directly or indirectly. They may be implemented in the form of an appropriate computer code executed on one or more processors. Processors should be understood to mean any processor suitable for the computations described hereinafter. Such a processor may be implemented in any known manner, in the form of a microprocessor for a personal computer, of a dedicated chip of FPGA or SoC (system on chip) type, of a computing resource on a grid, of a microcontroller, or any other form suitable for providing the computational power required for the implementation described below. One or more of these elements may also be implemented in the form of specialized electronic circuits, such as an ASIC. A combination of processor and electronic circuits may also be contemplated.

In the example described here, the memory 4 receives data from a mobile telephony operator (whether this be GSM, GPRS, EDGE, UMTS, LTE or developments thereof, or else a wide-area WiFi network of hotspot type). The memory 4 contains all of the signaling and activity data from one, several or all of the geographical zones covered by the operator. The memory 4 may be able to be accessed directly or remote, distributed over one or more sites, and correspond to the aggregation of a plurality of separate stores, including belonging to a plurality of operators sharing their resources. The memory 4 may be any type of data store able to receive digital data: hard drive, flash memory hard drive (SSD), flash memory in any form, random access memory, magnetic disk, locally distributed or cloud storage, etc. The data computed by the device may be stored on any type of memory similar to the memory 4 or on the latter. These data may be deleted after the device has performed its tasks, or kept.

The signaling data associate a mobile communication device identifier, a signaling identifier and a time marker. The time marker may be a raw marker or be accompanied by a duration. The mobile communication devices may be any device connecting to a GSM, GPRS, EDGE, UMTS or LTE mobile telephony network, or a development thereof, or to a wide-area WiFi network of hotspot type. The signaling identifiers may be taken from any signal on these networks, or from triangulation on the basis of these identifiers, and/or of GPS data communicated by the device.

The device 2 will first of all analyze the signaling data associated with each mobile device identifier so as to associate a movement marker with the location cell corresponding to the signaling identifiers and to the associated time markers. This triplet forms what will be called an event hereinafter.

Figure 2:
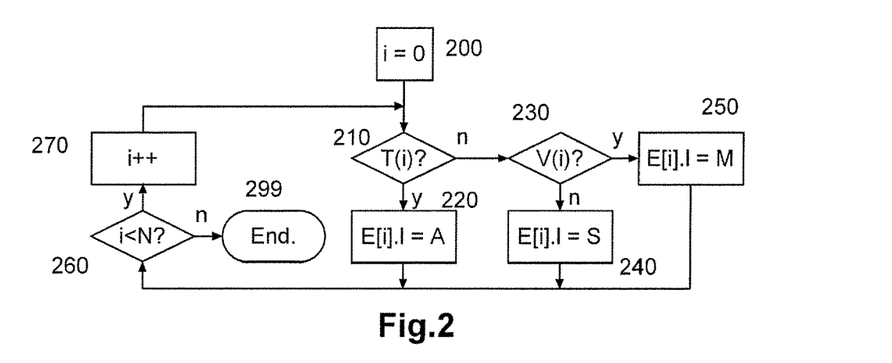
FIG. 2 shows an exemplary embodiment of a function by the classifier of FIG. 1.

FIG. 2 shows an example of a function implemented by the classifier 6 to achieve this.

In an operation 200, the classifier 6 sets a loop index i to 0. Next, in an operation 210, a function T( ) is executed so as to analyze the time marker associated with the signaling identifier of index i. The function T( ) determines the time that has elapsed between the time marker associated with the signaling identifier of index i and the preceding marker. If the duration is greater than a chosen threshold (for example greater than 4 hours, or 6 hours, or more), then, in an operation 220, a movement marker of long stop type is associated with the location cell and with the time marker that are associated with the signaling identifier of index i.

The time markers of long stop type are important, as they serve to 'divide' the series of events. Thus, all of the processing operations described hereinafter relate to sequences of events that are situated between two events indicating a long stop. At the very least, as soon as a long stop is detected, two sequences are generated, which will be processed independently.

Otherwise, in an operation 230, a function V( ) is executed in order to determine the difference in position between the location cell associated with the signaling identifier of index i and the one associated with the preceding signaling identifier of index i. If the function V( ) indicates that the speed of movement between these location cells is lower than a threshold speed (equal to around 10 km/h for example), then, in an operation 240, a movement marker of short stop type is associated with the location cell and with the time marker that are associated with the signaling identifier of index i. Otherwise, in an operation 250, a movement marker of movement type is associated with the location cell and with the time marker that are associated with the signaling identifier of index i. Thus, the events denote pairs of signaling identifiers that are associated with one and the same mobile communication device and that are consecutive in time, and an event is not of movement type unless the perceived movement speed is faster than walking speed. As a variant, the function V( ) could determine whether the location cell has not changed between the two successive signaling identifiers, rather than being based on the movement speed.

After a marker has been associated by one of the operations 220, 240 or 250, an operation 260 tests whether all of the signaling identifiers have been run through. When this is not the case, the index i is incremented in an operation 270. Otherwise, the function ends in an operation 299.

Once all of the data have been marked, the device 2 is able to process them. Specifically, many items of signaling data may not represent movement of a person. For example, a communication device may be surrounded by a plurality of antennae, and for various reasons be associated successively with many of these antenna without actually moving. In this case, the signaling data will indicate different location cells, thereby suggesting a movement, while the communication device (and therefore its user) has not moved. There may be numerous other scenarios that add noise and that have to be processed in order to obtain reliable path data.

The examples of functions shown in FIGS. 3 to 7 show how the analyzer 8 processes the marked data so as to take path data therefrom.

Figure 3:
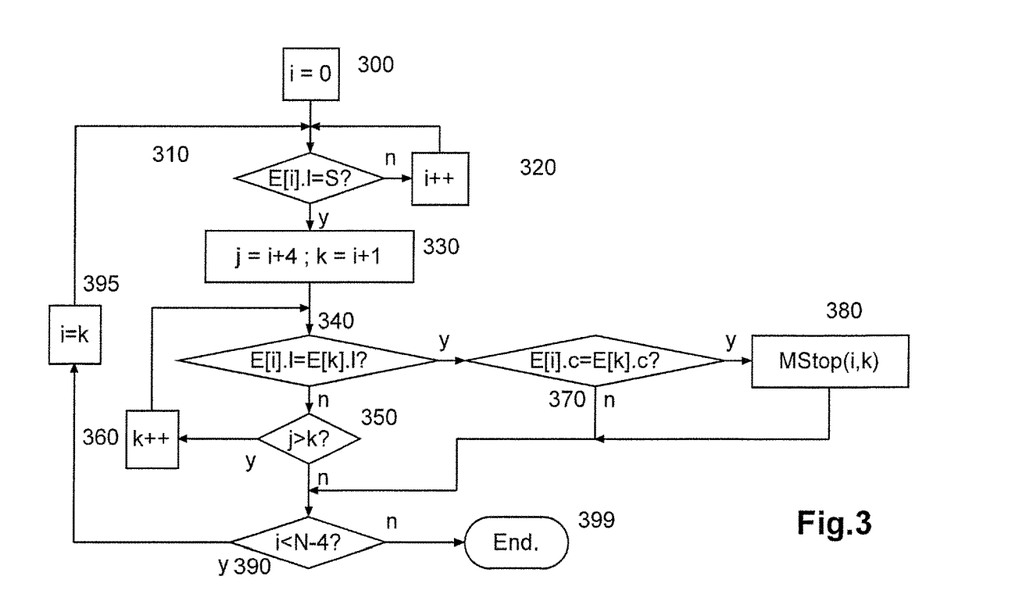
FIGS. 3 to 7 show exemplary embodiments of functions by the analyzer of FIG. 1.

FIG. 3 shows an exemplary embodiment of a first function. This function handles the case described above. Thus, when they are between two items of location data whose movement marker indicates a short stop in one and the same location cell and that are separated by fewer than four events, all of the movement markers are converted into a short stop.

Thus, in an operation 300, a loop index i is set to 0. Next, in an operation 310, a test is carried out to determine whether or not the event of index i has a movement marker E[i].1 that indicates a short stop. For as long as this is not the case, the index i is incremented in an operation 320, and the test of operation 310 is repeated.

As soon as a short stop is detected, an index j is defined with the value i plus 4, and a loop index k is defined with the value i plus 1 in an operation 330. Next, a loop determines whether there is an event between i and j that is also a short stop. To this end, a test is performed in an operation 340. For as long as this test is not positive, a test in an operation 350 checks that k is lower than j, and k is incremented in an operation 360.

When a short stop is found, a test in an operation 370 checks whether the two events E[i] and E[k] share the same location cell. If this is the case, then there are indeed two events with a movement marker of short stop type, and that are separated by fewer than four events. Then, a function MStop( ) receiving i and k as arguments transforms all of the movement markers E[n].1 into a short stop, with n being between i and k.

Next, or when operation 350 determines that there is not an event of short stop type fewer than 4 events from event i, or when the location cells of event i and that of event k are different, a test in an operation 390 checks whether there are still 4 operations to relaunch a loop. If so, then, in an operation 395, the index i is updated with the index k and the loop resumes with operation 310. Otherwise, the function ends in an operation 399.

Figure 4:
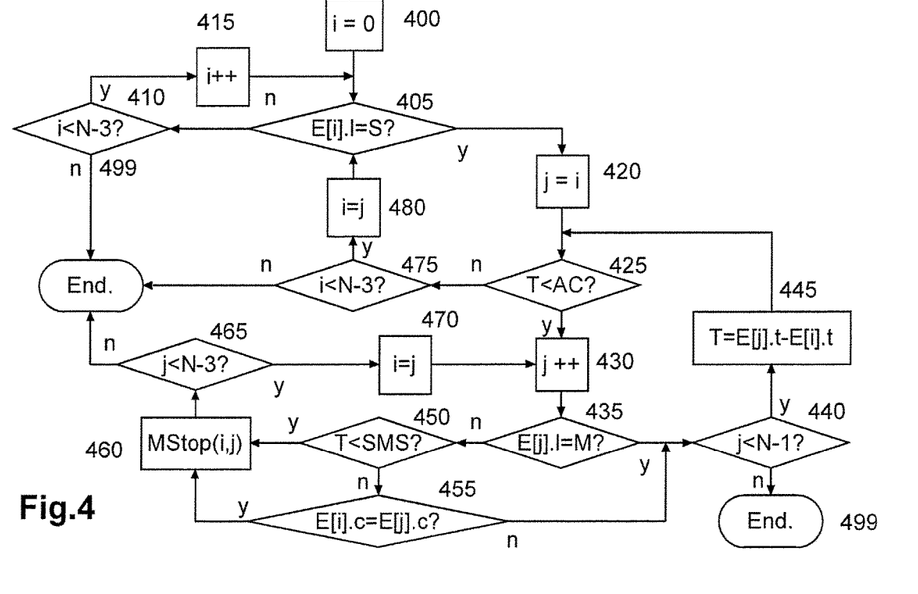

FIG. 4 shows another example of a function implemented by the analyzer 8. Specifically, when two events whose movement markers indicate a short stop are separated by a duration, and these events are separated by a duration shorter than a first threshold enabling a change from one cell to another, or the two events are associated with the same location cell but their time markers are separated by a duration greater than a second threshold indicating that a round trip to a neighboring cell was not possible, then all of the events between them are changed such that their movement marker indicates a short stop.

Thus, in an operation 400, a loop index i is set to 0. Next, in an operation 405, a test is carried out to determine whether or not the current event of index i is associated with a short stop. For as long as this test is negative, an operation 410 tests whether there are still at least three events (since the function searches for at least one event between two events of short stop type) and, if this is the case, the index i is incremented in an operation 415 and the test of operation 405 is repeated. If this is not the case, the function ends in an operation 499.

When an event whose movement marker indicates a short stop is found, a two-test loop is launched so as to attempt to check whether one of the two above conditions is met. To this end, in an operation 420, an index j equal to i is defined.

Next, there begins a loop in which two conditions are sought. If one of these two conditions is met, then the events situated between the two events the furthest apart in time are changed so as to mark them as corresponding to a short stop.

Thus, in an operation 425, the least constrictive stop condition is tested by comparing a duration T that indicates the difference between the time marker of the current event of index j and that of the event of index i. If the duration T is shorter than this first threshold AC, then the index j is incremented in an operation 430. Then, in an operation 435, a test determines whether the event of index j indicates a movement or a short stop. If a movement is involved, then, in an operation 440, a test determines whether the event of index j is the last or not. If this is the case, then the function ends with operation 499.

Otherwise, a duration T corresponding to the difference between the time marker of the event of index i and the event of index j is calculated in an operation 445, and then the loop resumes with operation 425, until an event indicating a short stop is found in operation 435.

When a second event indicating a short stop is found in operation 435, a test in an operation 450 determines whether the duration T is shorter than a second threshold SMS. If this is the case, then the second (most constrictive) condition is met, and in an operation 460, the function MStop( ) is called with the indices i and j to change the movement markers of the events between these indices into a short stop. Next, a test is carried out in an operation 465 to determine whether there are still 3 events in the list E[ ], as is the case for operation 410.

If this is not the case, then a test is carried out in an operation 455 to determine whether the events of indices i and j relate to the same location cell. If this is the case, then the first condition is met, and in an operation 460, the function MStop( ) is called with the indices i and j to change the movement markers of the events between these indices into a short stop, and then the test of operation 465 is carried out.

If the test of operation 455 is negative, then the loop continues with operation 440 until the first condition is met or the duration T exceeds the first threshold AC, or operation 440 indicates the end of the loop.

Lastly, when the test of operation 465 is positive, then the index i is updated with the value of the index j (since the event of index j indicates a short stop) in an operation 470, and the loop resumes with operation 430.

The first threshold AC and the second threshold SMS are stipulated such that AC is greater than SMS. The first threshold AC makes it possible to detect cases indicating a change of cell and then a return to the original cell, while the time necessary to do this (the time corresponding to the first threshold AC) was not long enough. Similarly, the second threshold SMS denotes an estimated time necessary to change from one cell to another neighboring cell.

In the example described here, the first threshold AC is around 10 minutes, whereas the second threshold SMS is around 6 minutes. Thus, the function will transform into short stops those events associated with a movement contained between two events associated with a short stop and separated by fewer than 6 (second threshold SMS) or 10 minutes (first threshold AC).

Figure 5:
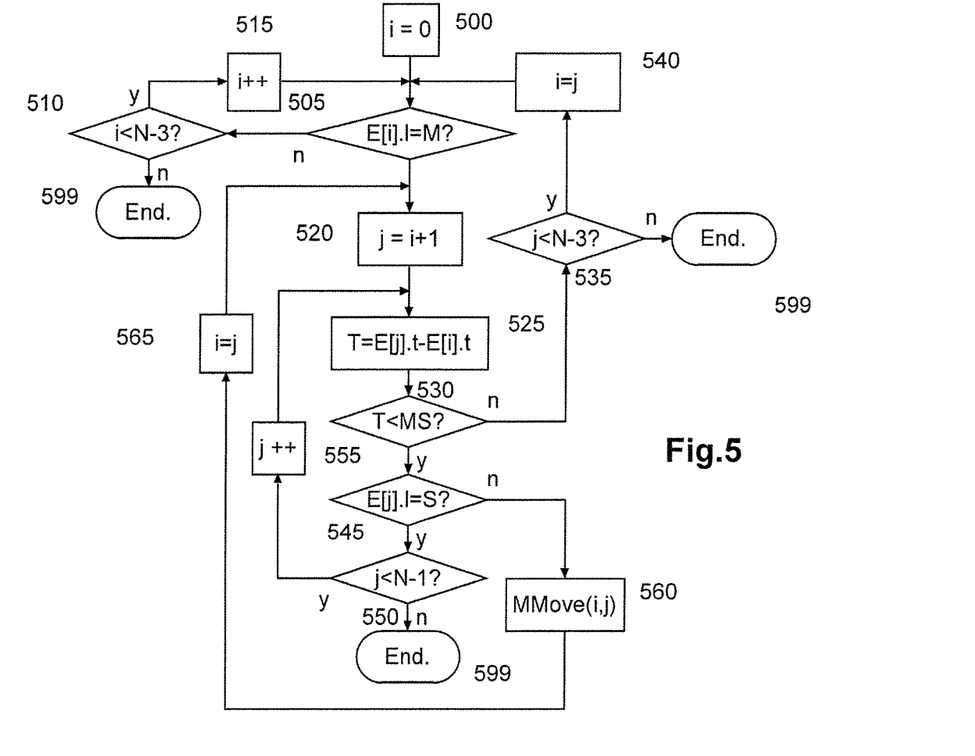

FIG. 5 shows another example of a function implemented by the analyzer 8. Specifically, when two events indicate a movement, and these events are separated by a duration shorter than a third threshold indicating that a short stop is not possible, then the intermediate events are changed such that their movement markers indicate a movement.

Thus, in an operation 500, a loop index i is set to 0. Next, in operations 505, 510 and 515 that are similar to operations 405, 410 and 415, the event of index i is tested and incremented until an event indicating a movement is found. The only difference is that operation 405 tests whether the event is of short stop type, whereas operation 505 tests whether the event is of movement type.

Next, a loop is launched in order to search for the event of index j whose movement marker indicates a movement and whose time marker indicates a duration shorter than the third threshold MS when compared with the time marker of the event of index i.

Thus, in an operation 520, an index j is defined as being equal to i plus 1, and then, in an operation 525, a duration T between the time marker of the event of index j and the time marker of the event of index i is calculated.

Next, in an operation 530, the duration T is compared with the third threshold in order to determine whether or not said threshold is exceeded. If this is the case, then a test similar to the one of operation 510 is carried out in an operation 535. If this is the case, then the index i is updated with the index j in an operation 540, and the next event indicating a movement is sought with operation 505. If this is not the case, then the function ends in an operation 599.

If the duration T is shorter than the third threshold, then, in an operation 545, a test determines whether the event of index j indicates a short stop. If this is the case, then, in an operation 550, a test determines whether the last operation of the list E is involved. If this is the case, then the function ends with operation 599. Otherwise, then the index j is incremented in an operation 555 and the loop resumes with operation 525 until finding a second event indicating a movement, or until the third threshold MS is exceeded.

When a second event indicating a movement is found in operation 545, a function MMove( ) is executed in an operation 560. The function MMove( ) receives the indices i and j as arguments for modifying the movement markers of the events between these indices into a movement. Lastly, in an operation 565, the index i is updated with j (since the event of index j indicates a movement), and the loop resumes with operation 520.

In the example described here, the third threshold MS is around 15 minutes. Thus, all of the events associated with a short stop between two events associated with a movement and separated by fewer than 15 minutes. As a variant, the threshold MS could be greater, and for example be one hour. In other words, this function is tantamount to considering that a short stop between two movements is not an anomaly if it lasts longer than a third threshold MS.

Figure 6:
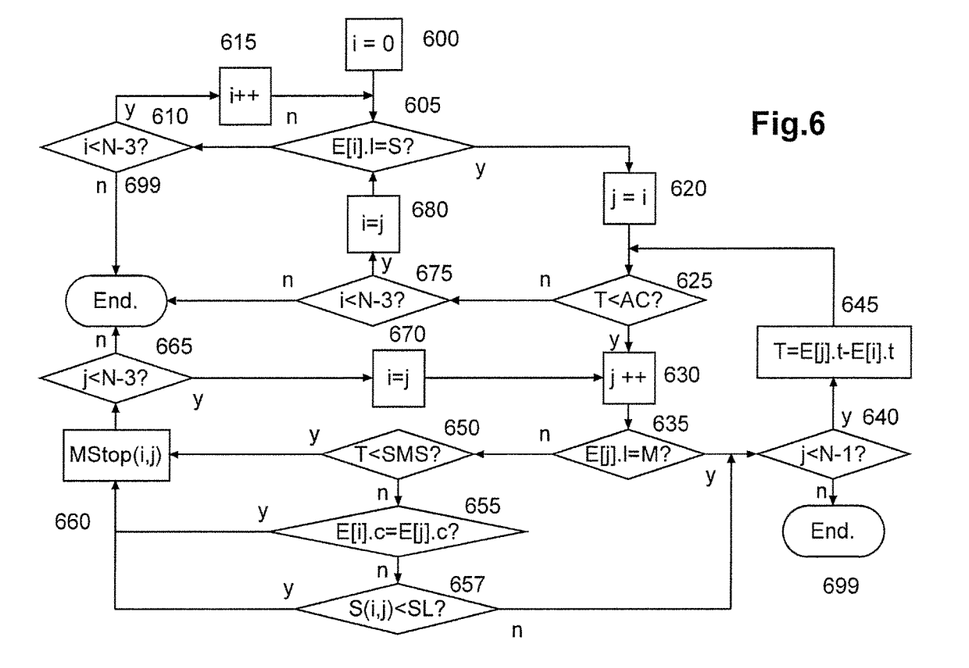

FIG. 6 shows another example of a function implemented by the analyzer 8. This function may be seen as a variant of the function shown in FIG. 4, or as an addition thereto, which may for example be executed after the function of FIG. 5.

In this function, the structure is similar, but the conditions that are sought differ:

the first, least constrictive, condition differs in that the location cells associated with the two events are not identical, the first threshold for its part also being identical, and the speed of movement between the two extreme short stops having to be lower than a threshold speed SL, the second condition is similar to the second condition of the function of FIG. 4, the second threshold being identical, but the location cells have to be identical in this case.

As the function of FIG. 6 is very close to that of FIG. 4, the numerical references have been kept the same, with the hundreds digit being changed. In fact, only operations 650 and 655 differ from operations 450 and 455, with an operation 657 being added.

Operation 650 tests the second condition, and the combination of operations 655 and 657 tests the first condition. In practice, the first condition should not be met, insofar as it corresponds to the same first condition as for the function of FIG. 4. However, it makes it possible to ensure that the function of FIG. 5 or any other function executed beforehand has not introduced an undesired case.

Operation 657 tests whether the 'as the crow flies' speed between the location cells associated with the events of indices i and j is lower than a threshold speed SL of around 10 km/h. Said speed is calculated by dividing the distance between the centers of the respective location cells by the duration between the two events. Thus, in the case where an event of noise type (for example if the mobile communication device associates with a remote station by accident) could give the impression of a movement between events i and j, this test makes it possible to correct this. Operation 655 is also not supposed to occur in practice but, if this should be the case, it makes it possible not to have to calculate the speed in operation 657, thereby representing a valuable time gain.

Once the analyzer 8 has executed the functions of FIGS. 3 to 6, it will simplify the resulting data so as to produce the path data. To this end, the analyzer 8 will merge all of the successive signaling data indicating a short stop and associate them, for a total duration corresponding to the difference between the time markers of the extreme events, with the location cell that is represented the most.

Figure 7:
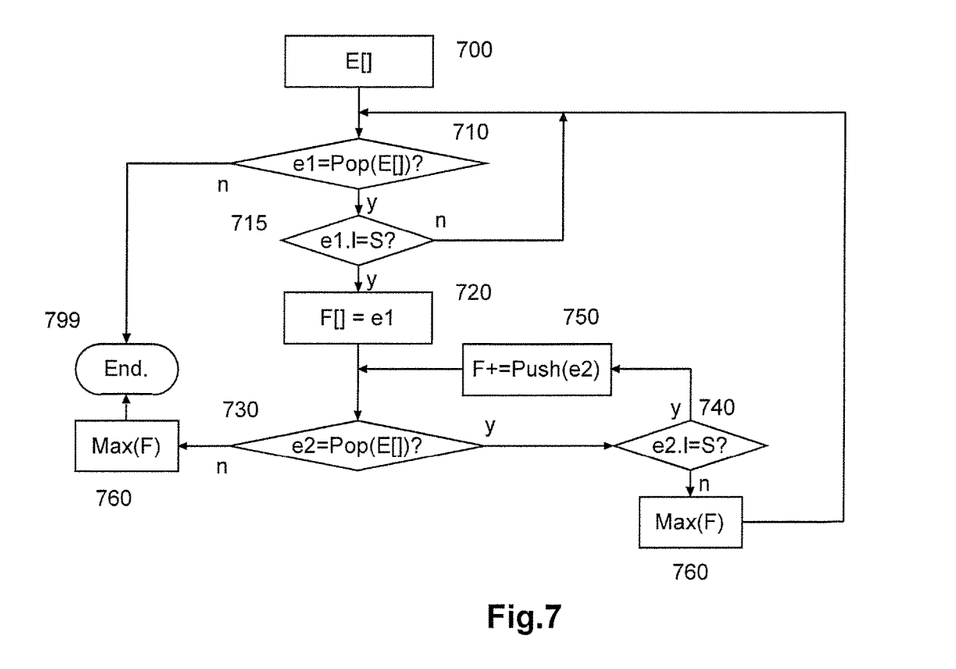

FIG. 7 shows an exemplary embodiment of this function. Thus, in an operation 700, the list of events E[ ] that is changed as above is used as a starting point.

Next, a loop will unstack this list and aggregate the events indicating a short stop when necessary. To this end, in an operation 710, the list E[ ] is unstacked into an event e1. When the list is empty, the function ends in an operation 799. In an operation 715, a test determines whether event e1 indicates a short stop. When this is not the case, operation 710 is repeated.

Next, in an operation 720, a list F[ ] is set with e1. The list F[ ] will receive all of the successive events indicating a short stop. In an operation 730, the list E[ ] is again unstacked, this time into an event e2. If there is no event e2, then, in an operation 740, a test determines whether event e2 relates to a short stop. If this is the case, then event e2 is inserted into the list F[ ] in an operation 750, and operation 720 is repeated. When the next event e2 that indicates a movement is found in operation 740, or when operation 730 indicates that the list E[ ] ends with a series of short stops, a function Max( ) receiving the list F[ ] as argument is executed in an operation 760. The function Max( ) has the function of merging the events in the list F[ ], by choosing the location cell that is represented the most in terms of duration in the list F[ ], and by compiling all of the events in this list into a single event whose duration corresponds to the difference between the most extreme time markers in the list F[ ], associated with the chosen location cell.

Thus, the path data produced at the output of the analyzer 8 contain series of events indicating a movement and/or a single event indicating a short stop.

In the example described here, the analyzer executes the functions of FIGS. 3 to 7 sequentially and successively. The analyzer thus first of all executes the function of FIG. 3 on all of the data, and then the function of FIG. 4 on the resulting data, etc. These successive functions make it possible to reduce the natural noise of the signaling data and to reduce the amount thereof, by producing path data that acquire a 'meaning' linked to the concept of movement other than by foot.

The series of events that result therefrom are particularly advantageous as they have a certain regularity that makes it possible to collate the paths so as to compile statistics and/or relate a series of events to a known path. They additionally make it possible to greatly reduce the noise that is inherent to the signaling data used as input, and to reduce the amount of computations for comparing them with one another, while making it possible to define significant episodes.

The path data that are produced thus represent segments that represent a tangible movement, even if it does not correspond perfectly to the original signaling data. Said data constitute an abstraction of the signaling data that makes it possible, by way of the nature of said data that denotes a movement or a short stop, to segment the original signaling data into significant episodes.

The concept of a short stop additionally makes it possible, in concrete terms, to determine a presence in a given location for a given range of time, this being almost impossible on the basis of the signaling data alone. It furthermore becomes possible to compare paths with reference paths.

Lastly, the path data constitute a form of signaling data compression: this enables computations on large volumes of location data. For example, the Applicant has been able to reduce a volume of data associated with an airport from around 4 TB to only 100 GB. This reduction has enabled the processing of path data to be made possible, which was not the case with the original mass of data, except for with the addition of a large number of servers.

The invention claimed is:

1. A path determination device, comprising:
   a memory for receiving signaling data associating mobile communication device identifiers, time markers and signaling identifiers, at least some of the signaling identifiers denoting a location cell;
   a classifier capable, for a given mobile communication device identifier, of marking the signaling data that are associated therewith with a movement marker indicating a state chosen from among a list comprising at least a movement and a short stop that is less than four hours; and
   an analyzer capable of processing the marked signaling data on the basis of the movement markers so as to produce path data associating a given mobile communication device identifier, on the one hand, and a series of movement markers each associated with a location cell and with a time marker, on the other hand, such that two movement markers whose time markers indicate that they are sequential denote different states, by applying at least one of the following rules:
   a) changing arbitrary movement markers into movement markers indicating a short stop when, for two movement markers indicating a short stop associated with a single location cell, the number of movement markers whose time markers indicate that they are between these two movement markers is less than or equal to 4;
   b) changing movement markers indicating a movement into movement markers indicating a short stop when the time markers that are associated therewith indicate that they are preceded and followed by movement markers indicating a short stop and the time markers associated with the movement markers that precede and follow the changing movement markers indicate a duration shorter than a first threshold;
   c) changing movement markers indicating a movement into movement markers indicating a short stop when the time markers that are associated therewith indicate that they are preceded and followed by movement markers indicating a short stop that are associated with one and the same location cell and the time markers associated with the movement markers that precede and follow the changing movement markers indicate a duration shorter than a second threshold;
   d) changing movement markers indicating a short stop into movement markers indicating a movement when the time markers that are associated therewith indicate that they are preceded and followed by movement markers indicating a movement and the time markers associated with the movement markers that precede and follow the changing movement markers indicate a duration shorter than a third threshold; and
   e) merging movement markers indicating a short stop whose time markers indicate that they are consecutive and associating a resulting movement marker with: a location cell associated with the movement markers whose time markers represent a longest duration amongst durations for each of the consecutive movement markers; and a time marker corresponding to a sum of the durations of the time markers that correspond to each of the consecutive movement markers.

2. The device as claimed in claim 1, wherein the classifier and the analyzer are called sequentially to produce path data.

3. A computer program product embodied on a non-transitory computer readable medium comprising portions of program code being implemented on the device as claimed in claim 1, wherein the program product is executed on a computer.

4. The device as claimed in claim 1, wherein the analyzer applies rule a) before applying rule b).

5. The device as claimed in claim 1, wherein the analyzer applies rule b) before applying rule c).

6. The device as claimed in claim 1, wherein the analyzer applies rule c) before applying rule d).

7. The device as claimed in claim 1, wherein the analyzer applies rule a) before applying rule b), and applies rule b) before applying rule c), and applies rule c) before applying rule d).

8. The device as claimed in claim 1, wherein the analyzer applies one of rules a), b), c) and d) before applying rule e).

9. A path determination method, comprising the following operations:
   a) receiving signaling data associating mobile communication device identifiers, time markers and signaling identifiers, at least some of the signaling identifiers denoting a location cell;
   b) for a given mobile communication device identifier, marking the signaling data that are associated therewith with a movement marker indicating a state chosen from among a list comprising at least a movement and a short stop that is less than four hours; and c) processing the marked signaling data on the basis of the movement markers so as to produce path data associating a given mobile communication device identifier, on the one hand, and a series of movement markers each associated with a location cell and with a time marker, on the other hand, such that two movement markers whose time markers indicate that they are sequential denote different states, by applying at least one of the following rules:

c1) changing arbitrary movement markers into movement markers indicating a short stop when, for two movement markers indicating a short stop associated with a single location cell, the number of movement markers whose time markers indicate that they are between these two movement markers is less than or equal to 4;

c2) changing movement markers indicating a movement into movement markers indicating a short stop when the time markers that are associated therewith indicate that they are preceded and followed by movement markers indicating a short stop and the time markers associated with the movement markers that precede and follow the changing movement markers indicate a duration shorter than a first threshold;

c3) changing movement markers indicating a movement into movement markers indicating a short stop when the time markers that are associated therewith indicate that they are preceded and followed by movement markers indicating a short stop that are associated with one and the same location cell and the time markers associated with the movement markers that precede and follow the changing movement markers indicate a duration shorter than a second threshold;

c4) changing movement markers indicating a short stop into movement markers indicating a movement when the time markers that are associated therewith indicate that they are preceded and followed by movement markers indicating a movement and the time markers associated with the movement markers that precede and follow the changing movement markers indicate a duration shorter than a third threshold;

c5) merging movement markers indicating a short stop whose time markers indicate that they are consecutive and associating a resulting movement marker with: a location cell associated with the movement markers whose time markers represent a longest duration amongst durations for each of the consecutive movement markers; and a time marker corresponding to a sum of the durations of the time markers that correspond to each of the consecutive movement markers.

10. A computer program product embodied on a non-transitory computer readable medium comprising portions of program code for implementing the method as claimed in claim 9, wherein the program product is executed on a computer.

11. The method as claimed in claim 9, wherein operation c) applies rule c1) before rule c2).

12. The method as claimed in claim 9, wherein operation c) applies rule c2) before applying rule c3).

13. The method as claimed in claim 9, wherein operation c) applies rule c3) before applying rule c4).

14. The method as claimed in claim 9, wherein operation c) applies rule c1) before rule c2), and applies rule c2) before applying rule c3), and applies rule c3) before applying rule c4).

15. The method as claimed in claim 9, wherein operation c) applies one of rules c1), c2), c3) and c4) before applying rule c5).

* * * * *